United States Patent [19]
Mader

[11] Patent Number: 5,818,669
[45] Date of Patent: Oct. 6, 1998

[54] ZENER DIODE POWER DISSIPATION LIMITING CIRCUIT

[75] Inventor: Urs H. Mader, Sunnyvale, Calif.

[73] Assignee: Micro Linear Corporation, San Jose, Calif.

[21] Appl. No.: 688,333

[22] Filed: Jul. 30, 1996

[51] Int. Cl.⁶ .................................................. H02H 7/00
[52] U.S. Cl. .............................. 361/18; 361/58; 361/91; 361/100; 361/115
[58] Field of Search ................................... 361/18, 56, 58, 361/91, 93, 100, 103, 115

[56] References Cited

U.S. PATENT DOCUMENTS

| 2,483,815 | 10/1949 | Easton | 175/356 |
|---|---|---|---|
| 2,967,267 | 1/1961 | Steinman et al. | 317/101 |
| 3,292,579 | 12/1966 | Buchanan | 119/5 |
| 3,549,990 | 12/1970 | Hochheiser | 323/44 |
| 3,611,021 | 10/1971 | Wallace | 315/239 |

(List continued on next page.)

FOREIGN PATENT DOCUMENTS

| 0 059 064 | 9/1982 | European Pat. Off. | H05B 41/392 |
|---|---|---|---|
| 0 178 852 | 4/1986 | European Pat. Off. | H05B 41/26 |
| 32 33 655 A1 | 5/1983 | Germany | H05B 41/29 |
| 34 32 266 A1 | 3/1985 | Germany | H05B 41/26 |
| 9201334 | 1/1992 | WIPO | H03K 3/281 |

OTHER PUBLICATIONS

J. Williams, "Techniques for 92% Efficient LCD Illumination" *Linear Technology Application Note 55*, pp. 1–43, Aug. 1993.

Micro Linear, "ML4874 LCD Backlight Lamp Driver," pp. 1–6, Apr. 1994.

Micro Linear, "ML4876 LCD Backlight Lamp Driver with Contrast," pp. 1–6, Apr. 1994.

U. Mader, et al., Micro Linear, "Application Note 26—Power Conversion Efficiencies for Miniature Fluorescent Lamp," pp. 1–6, Feb. 1994.

K. Kit Sum, et al., Micro Linear, "Application Note 32—Theory and Application of the ML4874 and ML4876 LCD Backlight Controller ICs," pp. 1–12, Jun. 1994.

J. J. LoCascio and U. H. Mader,"A New Control Technique Uses 25% Less Power To Drive Miniature Cold Cathode Fluorescent Lamps," *Electronic Ballast*, pp. 60–69, Apr. 1994.

M. Jordan and J.A. O'Connor, "Resonant Fluorescent Lamp Converter Provides Efficient and Compact Solution," *IEEE*, pp. 424–431, 1993.

Maxim Integrated Products, "CCFT Backlight and LCD Contrast Controllers—MAX753/MAX754," pp. 1–12, Feb. 1994.

(List continued on next page.)

*Primary Examiner*—Richard T. Elms
*Assistant Examiner*—Stephen Jackson
*Attorney, Agent, or Firm*—Haverstock & Owens LLP

[57] ABSTRACT

A circuit that utilizes a Zener diode to protect elements of a circuit from an over-voltage condition. When a fault occurs, causing an over-voltage condition, the voltage applied to the elements of the circuit is limited by the Zener diode. In addition, the circuit senses the over-voltage condition. Upon sensing the over-voltage condition, the circuit gradually reduces the power applied to that portion of the circuit to a minimum level. If the over-voltage condition persists for a predetermined amount of time, power is shut down to that portion of the circuit until the circuit is re-started. Because the amount of time that an over-voltage condition may occur is limited, the Zener diode may have a lower power rating than would otherwise be required. This is because the power dissipation capabilities of a Zener diode conducting current under a reverse bias are greater when the reverse bias is of a short duration than when the reverse bias is of a long duration. For example, the inventor has identified a Zener diode that is represented to have an ability to withstand 500 milli-watts under steady state conditions, but that can withstand for a limited duration a peak surge of many times the steady state power rating. In the preferred embodiment, the circuit limits voltage in a resonant circuit utilizing two Zener diodes coupled in series.

23 Claims, 6 Drawing Sheets

U.S. PATENT DOCUMENTS

| | | | |
|---|---|---|---|
| 3,671,782 | 6/1972 | Wittlinger et al. | 307/238 |
| 3,723,891 | 3/1973 | Whiteley | 329/103 |
| 3,758,823 | 9/1973 | Jett et al. | 315/219 |
| 3,772,625 | 11/1973 | Raupach | 336/94 |
| 3,778,677 | 12/1973 | Kriege | 315/219 |
| 3,828,203 | 8/1974 | Belson et al. | 307/228 |
| 3,840,795 | 10/1974 | Roszyk et al. | 320/2 |
| 3,893,036 | 7/1975 | Cavoretto et al. | 328/185 |
| 3,921,005 | 11/1975 | Watrous | 307/64 |
| 3,953,768 | 4/1976 | Meredith et al. | 317/31 |
| 4,030,058 | 6/1977 | Riffe et al. | 336/92 |
| 4,031,449 | 6/1977 | Trombly | 320/2 |
| 4,038,625 | 7/1977 | Tompkins et al. | 336/83 |
| 4,063,108 | 12/1977 | Klett et al. | 307/64 |
| 4,127,795 | 11/1978 | Knoll | 315/210 |
| 4,144,462 | 3/1979 | Sieron et al. | 307/66 |
| 4,145,592 | 3/1979 | Mizukawa et al. | 219/10.49 R |
| 4,146,857 | 3/1979 | Schleupen | 336/61 |
| 4,172,981 | 10/1979 | Smith | 307/66 |
| 4,207,498 | 6/1980 | Spira et al. | 315/97 |
| 4,210,846 | 7/1980 | Capewell et al. | 315/121 |
| 4,225,825 | 9/1980 | Watts | 328/185 |
| 4,251,752 | 2/1981 | Stolz | 315/206 |
| 4,260,943 | 4/1981 | Zaderej et al. | 320/21 |
| 4,277,726 | 7/1981 | Burke | 315/98 |
| 4,277,728 | 7/1981 | Stevens | 315/307 |
| 4,297,614 | 10/1981 | Chandler | 315/86 |
| 4,303,902 | 12/1981 | Lesster et al. | 336/83 |
| 4,318,608 | 3/1982 | Payne | 355/3 CH |
| 4,390,844 | 6/1983 | Ting | 328/142 |
| 4,412,265 | 10/1983 | Buuck | 361/18 |
| 4,414,493 | 11/1983 | Henrich | 315/308 |
| 4,441,053 | 4/1984 | Daspit | 315/206 |
| 4,441,054 | 4/1984 | Bay | 315/219 |
| 4,453,109 | 6/1984 | Stupp et al. | 315/219 |
| 4,486,689 | 12/1984 | Davis et al. | 315/92 |
| 4,495,446 | 1/1985 | Brown et al. | 315/206 |
| 4,496,896 | 1/1985 | Melocik et al. | 320/2 |
| 4,498,031 | 2/1985 | Stupp et al. | 315/307 |
| 4,523,131 | 6/1985 | Zansky | 315/307 |
| 4,528,482 | 7/1985 | Merlo | 315/291 |
| 4,543,556 | 9/1985 | Taylor et al. | 336/210 |
| 4,572,988 | 2/1986 | Handler et al. | 315/209 R |
| 4,585,974 | 4/1986 | Stupp et al. | 315/307 |
| 4,604,552 | 8/1986 | Alley et al. | 315/176 |
| 4,612,479 | 9/1986 | Zansky | 315/194 |
| 4,654,573 | 3/1987 | Rough et al. | 320/2 |
| 4,686,427 | 8/1987 | Burke | 315/219 |
| 4,698,554 | 10/1987 | Stupp et al. | 315/307 |
| 4,700,113 | 10/1987 | Stupp et al. | 315/224 |
| 4,704,563 | 11/1987 | Hussey | 315/307 |
| 4,717,863 | 1/1988 | Zeiler | 315/307 |
| 4,723,098 | 2/1988 | Grubbs | 315/306 |
| 4,739,227 | 4/1988 | Anderson | 315/260 |
| 4,763,239 | 8/1988 | Ball | 363/98 |
| 4,800,328 | 1/1989 | Bolger et al. | 320/2 |
| 4,806,880 | 2/1989 | Laws | 331/8 |
| 4,874,989 | 10/1989 | Nilssen | 315/151 |
| 4,893,059 | 1/1990 | Nilssen | 315/127 |
| 4,896,077 | 1/1990 | Dodd et al. | 315/289 |
| 4,920,299 | 4/1990 | Presz et al. | 315/98 |
| 4,935,669 | 6/1990 | Nilssen | 315/105 |
| 4,942,352 | 7/1990 | Sano | 320/2 |
| 4,952,849 | 8/1990 | Fellows et al. | 315/307 |
| 4,962,344 | 10/1990 | Bohrer | 307/260 |
| 5,015,919 | 5/1991 | Vila-Masot et al. | 315/86 |
| 5,045,732 | 9/1991 | Sugiura et al. | 307/529 |
| 5,048,033 | 9/1991 | Donahue et al. | 372/38 |
| 5,049,790 | 9/1991 | Herfurth et al. | 315/291 |
| 5,111,118 | 5/1992 | Fellows et al. | 315/307 |
| 5,177,408 | 1/1993 | Marques | 315/291 |
| 5,202,608 | 4/1993 | Johnson | 315/86 |
| 5,214,352 | 5/1993 | Love | 315/86 |
| 5,216,402 | 6/1993 | Carosa | 336/66 |
| 5,237,242 | 8/1993 | Takahashi et al. | 315/123 |
| 5,264,776 | 11/1993 | Hulsey | 320/2 |
| 5,363,020 | 11/1994 | Chen et al. | 315/209 R |
| 5,367,223 | 11/1994 | Eccher | 315/97 |
| 5,367,224 | 11/1994 | Pacholok | 315/219 |
| 5,367,242 | 11/1994 | Hulman | 320/2 |
| 5,384,516 | 1/1995 | Kawabata et al. | 315/160 |
| 5,394,020 | 2/1995 | Nienaber | 327/140 |
| 5,408,162 | 4/1995 | Williams | 315/224 |
| 5,410,188 | 4/1995 | Segaram | 327/237 |
| 5,410,221 | 4/1995 | Mattas et al. | 315/307 |
| 5,615,093 | 3/1997 | Nalbant | 363/25 |
| 5,642,066 | 6/1997 | Burke | 327/132 |

OTHER PUBLICATIONS

K. Kit Sum, Micro Linear, "ML4874 Evaluation Kit User's Guide—LCD Backlight Lamp Driver," pp. 1–5, Apr. 1994.

Micro Linear, "ML4864 Evaluation User's Guide—LCD Backlight Lamp Driver with Contrast Control," pp. 1–4, Jan. 1994.

Micro Linear, "ML4864 LCD Backlight Lamp Driver with Contrast Control," pp. 1–6, Nov. 1993.

Micro Linear, "Application Note 24", p. 3.

Micro Linear, "Advance Information ML–4830 Electronic Ballast Controller", Jun. 1992.

Micro Linear,"Advance Information ML–4830 Electronic Ballast Controller", Jul. 1992.

ZENER DIODE POWER DISSIPATION LIMITING CIRCUIT

FIELD OF THE INVENTION

The invention relates to the field of circuits for protecting circuit elements from damage under a fault condition. In particular, the invention relates to circuits that utilize low power Zener diodes for protecting circuit elements from damage caused by an over-voltage fault condition.

BACKGROUND OF THE INVENTION

Zener diodes are characterized in that they have sufficient power dissipation capabilities to operate in the breakdown region under a reverse bias. When a reverse bias voltage sufficient to cause breakdown is applied to a Zener diode, the Zener diode conducts current, clamping the applied voltage to a constant level. The level of reverse bias voltage required to cause a Zener diode to enter the breakdown region (the breakdown voltage) is controllable depending upon the physical characteristics of the diode junction. Thus, Zener diodes are commonly used as voltage regulators and in other circuits requiring a constant reference voltage.

Another use for Zener diodes is to protect circuit components from an over-voltage condition by preventing a circuit node from exceeding the breakdown voltage. Under normal operating conditions, the voltage level is expected to remain below the breakdown voltage. Therefore, under normal operating conditions, the Zener diode does not affect the operation of the circuit. Under a fault condition, however, which could cause component failure by applying excessive voltage, the applied voltage is prevented by the Zener diode from exceeding the breakdown voltage.

When a Zener diode is utilized to protect circuit elements from an over-voltage condition, the power rating of the Zener diode must exceed the maximum power expected to be applied to the Zener diode. Otherwise, the Zener diode may fail to protect the circuit elements. The cost and size of a Zener diode generally increases as its power rating increases.

Therefore, what is needed is a circuit utilizing a Zener diode for protecting circuit elements from damage caused by an over-voltage condition that minimizes the required power rating of the Zener diode.

SUMMARY OF THE INVENTION

The invention is a circuit that utilizes a Zener diode to protect elements of a circuit from an over-voltage condition. When a fault occurs, causing an over-voltage condition, the voltage applied to the elements of the circuit is limited by the Zener diode. In addition, the circuit senses the over-voltage condition. Upon sensing the over-voltage condition, the circuit gradually reduces the power applied to that portion of the circuit to a minimum level. This minimum level is chosen to be high enough to continue breaking down the Zener diode, but low enough to limit the power dissipated by the Zener diode. If the over-voltage condition persists for a predetermined amount of time, power is shut down to that portion of the circuit until the circuit is re-started. Because the amount of time that an over-voltage condition may occur is limited, the Zener diode may have a lower power rating than would otherwise be required. This is because the power dissipation capabilities of a Zener diode conducting current under a reverse bias are greater when the reverse bias is of a short duration than when the reverse bias is of a long duration. For example, the inventor has identified a Zener diode that is represented to have an ability to withstand 500 milli-watts under steady state conditions, but that can withstand for a limited duration a peak surge of many times the steady state power rating.

In the preferred embodiment of the invention, a circuit provides power to a fluorescent lamp. The fluorescent lamp is coupled to a secondary winding of a transformer. A primary winding of the transformer is coupled to a resonant circuit. A train of pulses are applied to the resonant circuit at the resonant frequency to provide power to the lamp. A voltage of the resonant circuit is limited by a pair of Zener diodes coupled in series to protect the circuit elements from damage. Therefore, the voltage is limited to the reverse bias breakdown voltage of a first Zener diode plus the forward bias voltage of a second Zener diode. If an over-voltage fault condition occurs, the circuit senses the fault condition and begins to gradually (over about 1 ms) reduce power to the resonant circuit to a minimum level by reducing the width of the pulses applied to the resonant circuit. If the fault condition persists for a predetermined period of time (about 50 ms to 2 s), the circuit shuts down power to the resonant circuit. After a shut-down, power may be restored to the resonant circuit by re-starting the system.

Because the applied power is reduced after detecting a fault condition, and the time period is limited between the occurrence of the fault condition and shutting down the applied power, lower power Zener diodes may be utilized than would otherwise be required.

BRIEF DESCRIPTION OF THE DRAWINGS

FIGS. 3A–3J shows a timing diagram for signals of the circuits shown in FIGS. 3a–3J and 4a–4e.

FIGS. 4a–4e shows a diagram of waveforms relating to start-up of the lamp and to an over-voltage fault condition.

DETAILED DESCRIPTION OF THE PREFERRED EMBODIMENT

Figure 1A:
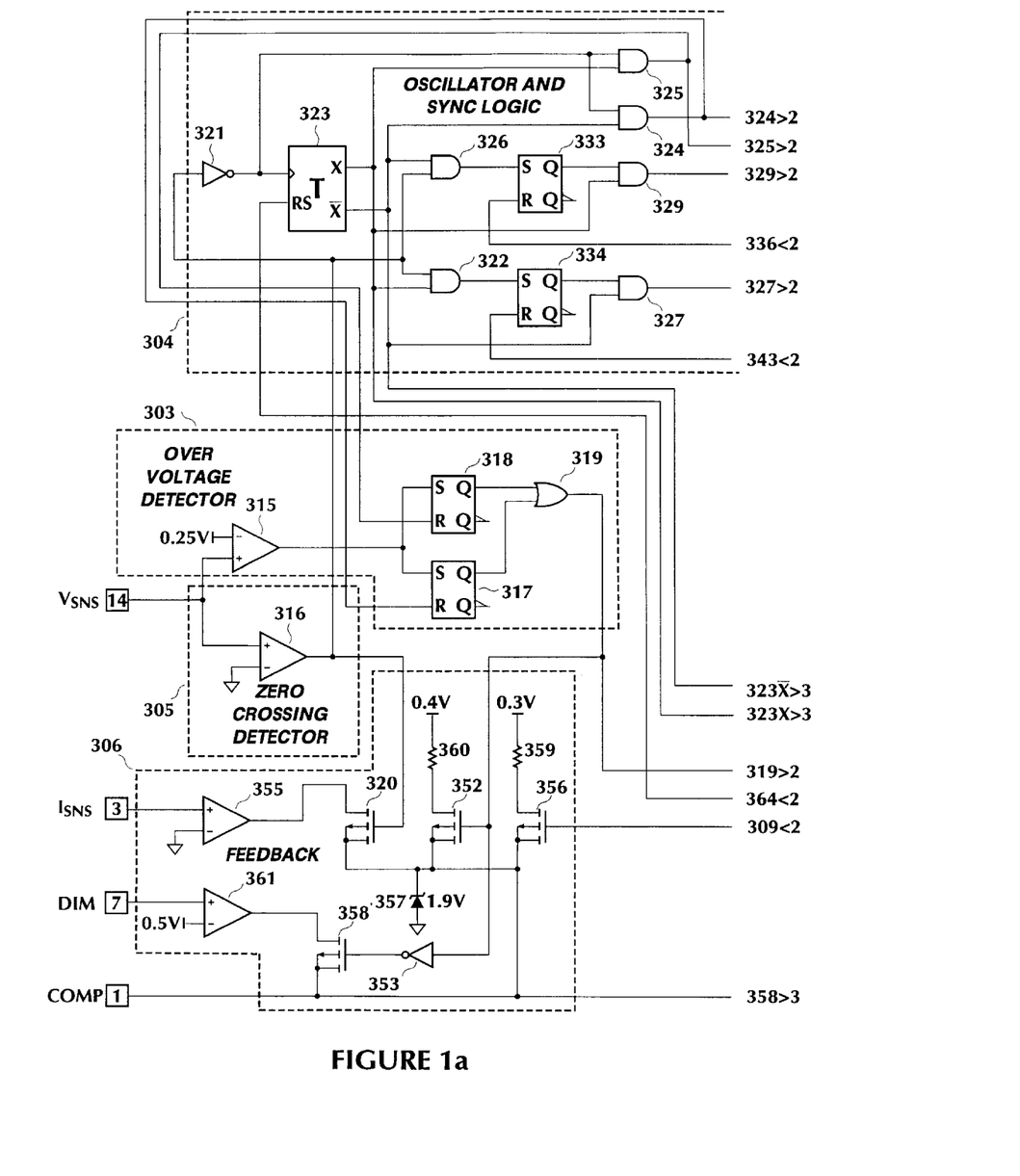
FIG. 1 shows a schematic diagram of a controller circuit of the present invention.
Figure 1B:
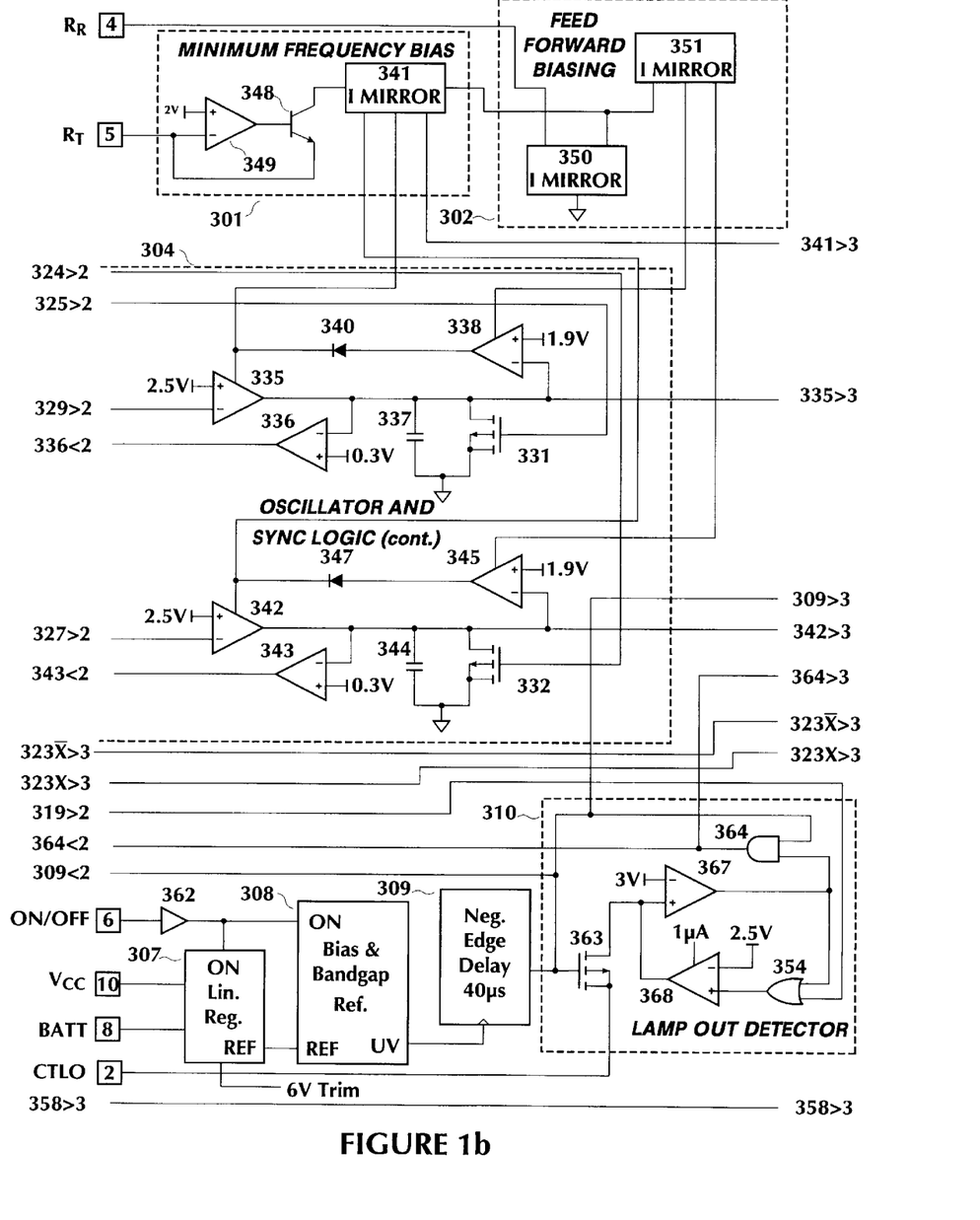
Figure 1C:
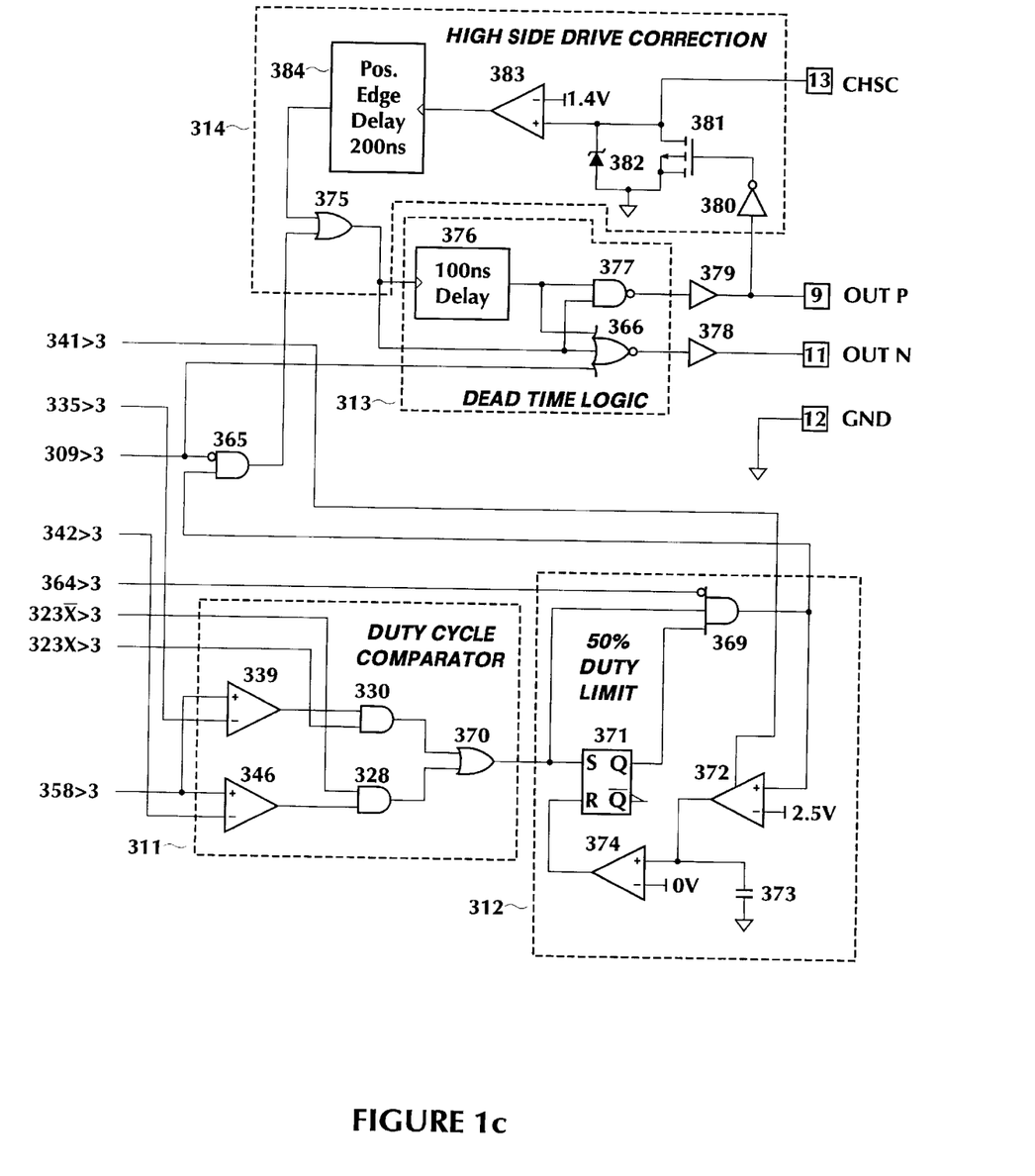

Referring to FIG. 1, a controller 300 of the present invention is shown. The present invention comprises a portion of the controller 300, however, the entire controller 300 is shown for illustrative purposes. The controller 300 preferably comprises an integrated circuit chip, but could be constructed from discrete components. Further, the controller 300 is preferably an integrated circuit chip controller available from Micro Linear Corporation, located at 2092 Concourse Drive, in San Jose, Calif., zip code 95131, under part number ML4878.

The controller comprises a minimum frequency bias circuit 301, a feed forward biasing circuit 302, an over voltage detector circuit 303, an oscillator and sync logic circuit 304, a zero crossing detector circuit 305, a feedback circuit 306, a linear regulator circuit 307, a bias & bandgap reference circuit 308, a negative edge delay circuit 309, a lamp out detector circuit 310, a duty cycle comparator circuit 311, a 50% duty cycle limit circuit 312, a dead time logic circuit 313 and a high side drive correction circuit 314. The controller also comprises a COMP pin 1, a CTLO pin 2, an ISNS pin 3, an RR pin 4, an RT pin 5, a DIM pin 7, an ON/OFF pin 6, a BATT pin 8, an OUTP pin 9, a VCC pin 10, an OUTN pin 11, a GND pin 12, a CHSC pin 13, and a VSNS pin 14.

The VSNS pin 14 is coupled to a non-inverting input to a comparator 315 and to a non-inverting input to a comparator 316. An inverting input to the comparator 315 is coupled to a voltage source of 0.25 volts. An inverting input to the comparator 316 is coupled to the ground node. An output of the comparator 315 is coupled to an S input to an R-S flip-flop 317 and to an S input to an R-S flip-flop 318. A Q output of the flip-flop 317 is coupled to a first input to an OR gate 319. A Q output of the flip-flop 318 is coupled a second input to the OR gate 319.

An output of the comparator 316 is coupled to a gate of an NMOSFET 320, to an input to an inverter 321, and to a first input to an AND gate 322. An output of the inverter 321 is coupled to a clock input to a T flip-flop 323, to a first input to an AND gate 324, and to a first input to an AND gate 325. An X-not output of the T flip-flop 323 is coupled to a second input to the AND gate 324, to a first input to an AND gate 326, to a first input to an AND gate 327, and to a first input to an AND gate 328. The output of the comparator 316 is also coupled to a second input to the AND gate 326. An X output of the T flip flop 323 is coupled to a second input to the AND gate 325, to a first input to an AND gate 329, to a second input to the AND gate 322, and to a first input to an AND gate 330.

An output of the AND gate 325 is coupled to an R input to the R-S flip-flop 318 and to a gate of an NMOSFET 331. An output of the AND gate 324 is coupled to an R input to the R-S flip-flop 317 and to a gate of an NMOSFET 332. An output of the AND gate 326 is coupled to an S input to an R-S flip-flop 333. A Q output of the R-S flip-flop 333 is coupled to a second input to the AND gate 329. An output of the AND gate 322 is coupled to an S input to an R-S flip-flop 334. A Q output of the R-S flip-flop 334 is coupled to a second input to the AND gate 327.

An output of the AND gate 329 is coupled to an inverting input to a transconductance amplifier 335. A non-inverting input to the transconductance amplifier 335 is coupled to a voltage source of 2.5 volts. An output of the transconductance amplifier 335 is coupled to an inverting input to a comparator 336, to a first terminal of a capacitor 337, to a drain of the NMOSFET 331, to an inverting input to a transconductance amplifier 338, and to an inverting input to a comparator 339. A second terminal of the capacitor 337 is coupled to a source of the NMOSFET 331 and to the ground node. A non-inverting input to the comparator 336 is coupled to a voltage source of 0.3 volts. An output of the comparator 336 is coupled to an R input to the R-S flip-flop 333. A non-inverting input to the transconductance amplifier 338 is coupled to a voltage source of 1.9 volts. An output of the transconductance amplifier 338 is coupled to an anode of a diode 340. A cathode of the diode 340 and a first terminal of a current mirror 341 are coupled to the transconductance amplifier 335 to control the gain of the transconductance amplifier 335.

An output of the AND gate 327 is coupled to an inverting input to a transconductance amplifier 342. A non-inverting input to the transconductance amplifier 342 is coupled to a voltage source of 2.5 volts. An output of the transconductance amplifier 342 is coupled to an inverting input to a comparator 343, to a first terminal of a capacitor 344, to a drain of the NMOSFET 332, to an inverting input to a transconductance amplifier 345, and to an inverting input to a comparator 346. A second terminal of the capacitor 344 is coupled to a source of the NMOSFET 332 and to the ground node. A non-inverting input to the comparator 343 is coupled to a voltage source of 0.3 volts. An output of the comparator 343 is coupled to an R input to the R-S flip-flop 334. A non-inverting input to the transconductance amplifier 345 is coupled to a voltage source of 1.9 volts. An output of the transconductance amplifier 345 is coupled to an anode of a diode 347. A cathode of the diode 347 and a second terminal of a current mirror 341 are coupled to the transconductance amplifier 342 to control the gain of the transconductance amplifier 342.

A third terminal of the current mirror 341 is coupled to a collector of an npn bipolar transistor 348. An emitter of the bipolar transistor 348 is coupled to an inverting input to a amplifier 349 and to the RT pin 5. A non-inverting input to the amplifier 349 is coupled to a voltage source of 2 volts. An output of the amplifier 349 is coupled to a base of the bipolar transistor 348. A fourth terminal of the current mirror 341 is coupled to a first terminal of a current mirror 350 and to a first terminal of a current mirror 351. A second terminal of the current mirror 350 is coupled to the RR pin 4. A third terminal of the current mirror 350 is coupled to the ground node. A second terminal of the current mirror 351 is coupled to control the gain of the transconductance amplifier 338. A third terminal of the current mirror 351 is coupled to control the gain of the transconductance amplifier 345.

An output of the OR gate 319 is coupled to a gate of an NMOSFET 352, to an input to an inverter 353, and to a first input to an OR gate 354. The ISNS pin 3 is coupled to a non-inverting input to a transconductance amplifier 355. An inverting input to the transconductance amplifier 355 is coupled to the ground node. An output of the transconductance amplifier 355 is coupled to a drain of the NMOSFET 320. A source of the NMOSFET 320 is coupled to a source of the NMOSFET 352, to a source of an NMOSFET 356, to a cathode of a 1.9 volt Zener diode 357, to a source of an NMOSFET 358, to a non-inverting input to the comparator 339, to a non-inverting input to the comparator 346, and to the COMP pin 1. An anode of the diode 357 is coupled to the ground node. A drain of the NMOSFET 356 is coupled to a first terminal of a 5 kohms resistor 359. A second terminal of the resistor 359 is coupled to a voltage source of 0.3 volts. A drain of the NMOSFET 352 is coupled to a first terminal of a 100 kohms resistor 360. A second terminal of the resistor 360 is coupled to a voltage source of 0.4 volts.

An output of the inverter 353 is coupled to a gate of the NMOSFET 358. The DIM pin 7 is coupled to a non-inverting input to a transconductance amplifier 361. An inverting input to the transconductance amplifier 361 is coupled to a voltage source of 0.5 volts. An output of the transconductance amplifier 361 is coupled to a drain of the NMOSFET 358. The ON/OFF pin 6 is coupled to an input to a buffer 362. An output of the buffer 362 is coupled to an ON input to the linear regulator 307, and to an ON input to the bias & bandgap reference circuit 308. The BATT pin 8 is coupled to supply power to the linear regulator 307. The VCC pin 10 is coupled to the linear regulator 307. A REF terminal of the linear regulator is coupled to a REF terminal of the bias & bandgap reference circuit 308. An output UV of the bias & and bandgap reference circuit 308 is coupled to an input to the 40 us negative edge delay circuit 309.

An output of the negative edge delay circuit 309 is coupled to a gate of the NMOSFET 356, to a gate of an NMOSFET 363, to a first input to an AND gate 364, to a first inverted input to an AND gate 365, and to a first input to an OR gate 366. A drain of the NMOSFET 363 is coupled a non-inverting input to a comparator 367, to an output of a transconductance amplifier 368, and to the CTLO pin 2. A source of the NMOSFET 363 is coupled to the GND node. An inverting input to the comparator 367 is coupled to a voltage source of 3 volts. An output of the comparator 367 is coupled to a second input to the AND gate 364 and to a second input to the OR gate 354. An output of the OR gate 354 is coupled to a non-inverting input to the transconductance amplifier 368. An inverting input to the transconductance amplifier 368 is coupled to a voltage source of 2.5 volts. The transconductance amplifier is biased with a current of 1 uA.

An output of the AND gate 364 is coupled to an RS input to the flip-flop 323 and to a first inverting input to an AND gate 369. An output of the comparator 339 is coupled to a second input to the AND gate 330. An output of the comparator 346 is coupled to a second input to the AND gate 328. An output of the AND gate 330 is coupled to a first input to an OR gate 370. An output of the AND gate 328 is coupled a second input to the OR gate 370. An output of the OR gate 370 is coupled to an S input to an R-S flip-flop 371 and to a second input to the AND gate 369. A Q output of the flip-flop 371 is coupled to a third input to the AND gate 369. An output of the AND gate 369 is coupled to a second input to the AND gate 365 and to a non-inverting input to a transconductance amplifier 372. An inverting input to the transconductance amplifier 372 is coupled to a voltage source of 2.5 volts. A fifth terminal of the current mirror 341 is coupled to control the gain of the transconductance amplifier 372.

An output of the transconductance amplifier 372 is coupled to a first terminal of a capacitor 373 and to a non-inverting input to a comparator 374. A second terminal of the capacitor 373 is coupled to the ground node. An inverting input to the comparator 374 is coupled to the ground node. An output of the comparator 374 is coupled to an R input to the flip-flop 371. An output of the AND gate 365 is coupled to a first input to an OR gate 375. An output of the OR gate 375 is coupled to an input to a 100 ns delay circuit 376, to a first input to a NAND gate 377, and to a second input to the NOR gate 366. An output of the delay circuit 376 is coupled to a second input to the NAND gate 377 and to a third input to the NOR gate 366.

An output of the NOR gate 366 is coupled to an input to a buffer 378. An output of the buffer 378 is coupled to the OUTN pin 11. An output of the NAND gate 377 is coupled to an input to a buffer 379. An output of the buffer 379 is coupled to the OUTP pin 9 and to an input to an inverter 380. An output of the inverter 380 is coupled to a gate of an NMOSFET 381. A source of the NMOSFET 381 is coupled to the ground node. A drain of the NMOSFET 382 is coupled to the CHSC pin 13, to an cathode of a 2.1 volt Zener diode 382, and to a non-inverting input to a comparator 383. An inverting input to the comparator 383 is coupled a voltage source of 1.4 volts. An output of the comparator 383 is coupled to an input to a 200 ns positive edge delay circuit 384. An output of the positive edge delay circuit is coupled to a second input to the OR gate 375. An anode of the diode 382 is coupled to the ground node. The GND pin 12 is coupled to the ground node.

Figure 2:
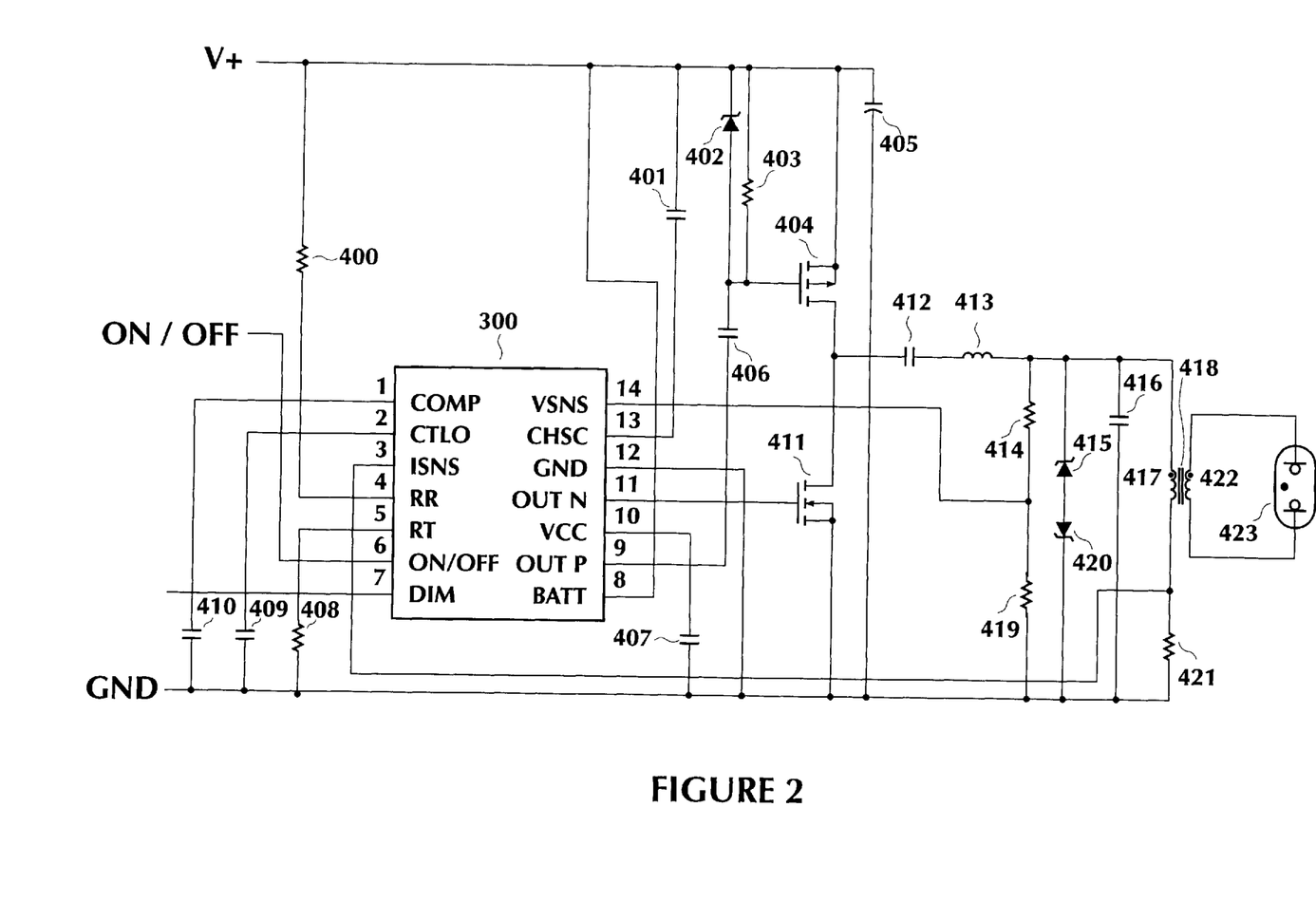
FIG. 2 shows a schematic diagram of circuits external to the controller circuit of the present invention.

FIG. 2 shows a schematic diagram of circuits external to the controller chip 300 of FIG. 1. Referring to FIG. 2, a voltage supply V+, such as a battery, is coupled to the BATT pin 8 of the controller 300, to a first terminal of a resistor 400, to a first terminal of a capacitor 401, to a cathode of a Zener diode 402, to a first terminal of a resistor 403, to a source of a PMOSFET 404 and to a first terminal of a capacitor 405. A second terminal of the resistor 400 is coupled to the RR pin 4 of the controller 300. A second terminal of the capacitor 401 is coupled to the CHSC pin 13 of the controller 300. An anode of the Zener diode 402 is coupled to a second terminal of the resistor 403, to a gate of the PMOSFET 404, and to a first terminal of a capacitor 406. A second terminal of the capacitor 406 is coupled to the OUTP pin 9 of the controller 300. A second terminal of the capacitor 405 is coupled to the ground node.

The DIM pin 7 of the controller 300 is coupled to be controlled by an external circuit for dimming the lamp. The VCC pin 10 of the controller 300 is coupled to a first terminal of a capacitor 407. A second terminal of the capacitor 407 is coupled to the ground node. The RT pin 5 of the controller 300 is coupled to a first terminal of a resistor 408. A second terminal of the resistor 408 is coupled to the ground node. The CTLO pin 2 of the controller 300 is coupled to a first terminal of a capacitor 409. A second terminal of the capacitor 409 is coupled to the ground node. The COMP pin 1 of the controller 300 is coupled to a first terminal of a capacitor 410. A second terminal of the capacitor 410 is coupled to the ground node.

The GND pin 12 of the controller 300 is coupled to the ground node. The ON/OFF pin 6 of the controller 300 is coupled to be controlled by an external circuit for turning the lamp on or off. The OUTN pin 11 of the controller 300 is coupled to a gate of an NMOSFET 411. A drain of the NMOSFET 411 is coupled to a drain of the PMOSFET 404 and to a first terminal of a capacitor 412. A source of the NMOSFET 411 is coupled to the ground node. A second terminal of the capacitor 412 is coupled to a first terminal of an inductor 413. A second terminal of the inductor 413 is coupled to a first terminal of a resistor 414, to a cathode of a Zener diode 415, to a first terminal of a capacitor 416, and to a first terminal of a primary winding 417 of a transformer 418. According to the "dot convention" for determining transformer winding polarities, the first terminal of the primary winding 417 is designated with a dot.

A second terminal of the resistor 414 is coupled to the VSNS pin 14 of the controller 300 and to a first terminal of a resistor 419. A second terminal of the resistor 419 is coupled to the ground node. An anode of the Zener diode 415 is coupled to an anode of a Zener diode 420. A cathode of the Zener diode 420 is coupled to the ground node. A second terminal of the capacitor 416 is coupled to the ground node. A second terminal of the primary winding 417 is coupled to a first terminal of a resistor 421 and to the ISNS pin 3 of the controller 300. A second terminal of the resistor 421 is coupled to the ground node.

A first terminal of a secondary winding 422 of the transformer 418 is coupled to a first terminal of a cold cathode fluorescent lamp 423. According to the "dot convention," the first terminal of the secondary winding 422 is designated with a dot. A second terminal of the secondary winding 422 is coupled to a second terminal of the fluorescent lamp 423.

FIGS. 3A–3J shows a timing diagram for signals of the circuit shown in FIGS. 1 and 2. Referring to FIGS. 3A–3J, BATT is the input signal to the BATT pin 8 of the controller 300 as shown in FIG. 2. VSNS is representative of the signal applied to the fluorescent lamp 423 shown in FIG. 2 and is the signal applied to the VSNS pin 14 of the controller 300 shown in FIGS. 1 and 2. An object of the invention is to drive a lamp with resonant circuit at its resonant frequency by inputting pulses to the resonant circuit wherein the pulses are centered about a zero crossing of the lamp signal VSNS. ZX is the signal at the output of the comparator 316 of FIG. 1. The comparator 316 serves as a zero crossing detector for the signal VSNS applied to the lamp 423. The signal ZX is at a logical high voltage level when the signal VSNS is above zero volts and at a logical low voltage level when the signal VSNS is below zero volts. The X signal of FIGS. 3A–3J is obtained by the logic circuits coupled to the output of the comparator 316. The RAMPA signal of FIGS. 3A–3J is the voltage across the capacitor 337 of FIG. 1. The RAMPB signal of FIGS. 3A–3J is the voltage across the capacitor 344 of FIG. 1.

The DCMP signal is representative of the centered pulse signal used to drive the resonant lamp circuit. The DCMP signal is formed by logic of the duty cycle compare circuit 311 and the oscillator and sync logic circuit 304 which combines the outputs of the comparator 339 and the comparator 346 such that the pulses in the DCMP signal are alternately formed by the RAMPA comparison and the RAMPB comparison, as described above. This is effected by the X and X-not outputs of the flip-flop 323 which are coupled to the AND gates 330 and 328.

Referring to FIGS. 3A–3J, the RAMPA signal, having been discharged by transistor 331, begins at zero volts prior to a first positive zero crossing 1 of the VSNS signal. When the first positive zero crossing 1 of the VSNS signal is reached, at approximately the time T1, as detected by the comparator 316, the logic circuits of the oscillator and sync logic circuit 304 of FIG. 1 cause the transconductance amplifier 335 to begin charging the capacitor 337 at a rate determined by the biasing signal to the transconductance amplifier 335. At the next negative zero crossing of the VSNS signal, at the time T3, the logic circuits of the oscillator and sync logic circuit 304 cause the capacitor 337 to begin discharging at the same rate that it was charged. When the voltage on the capacitor 337 reaches zero (actually 0.3 volts as determined by the voltage at the non-inverting input to the comparator 336), at the time T6, the logic circuits of the oscillator and sync logic circuit 304 stop discharging the capacitor 337 and begin charging the capacitor 337.

Figures 3A, 3B:
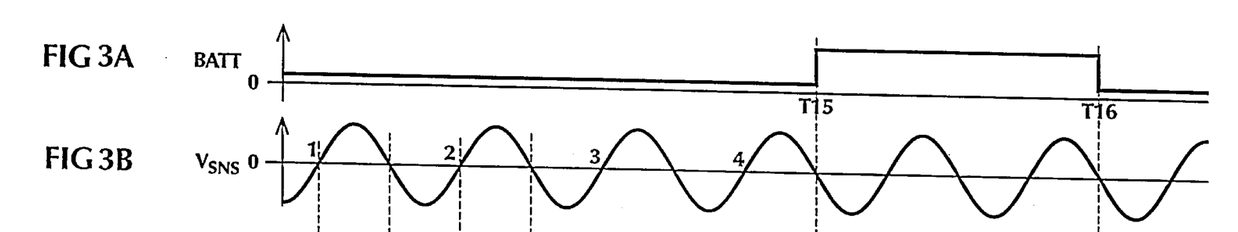
Figure 3C:
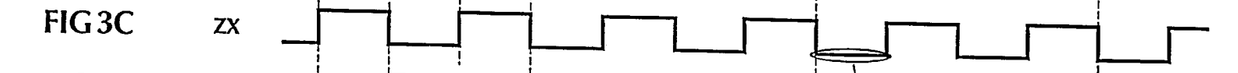
Figures 3D, 3E:
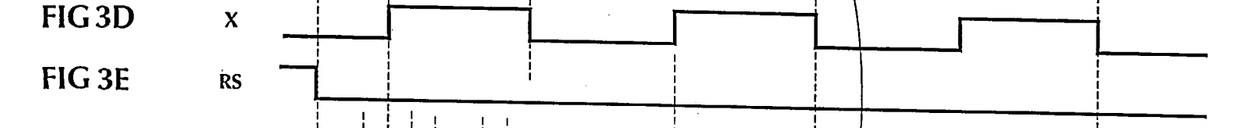
Figure 3F:
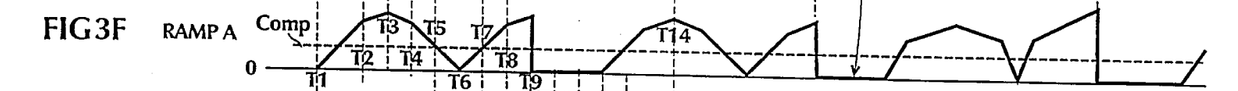
Figure 3G:
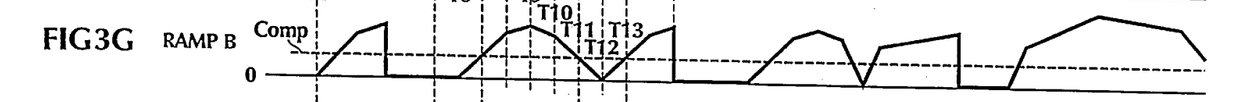
Figure 3H:
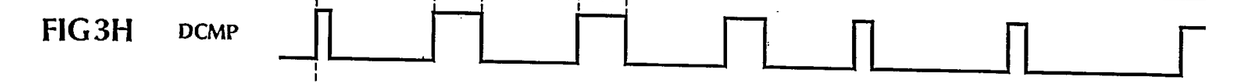
Figure 3I:
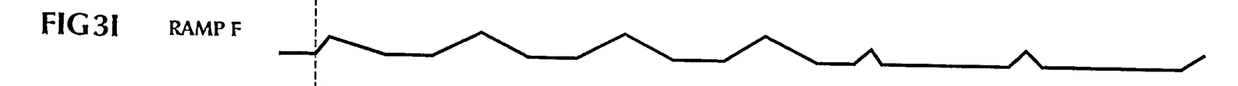
Figure 3J:
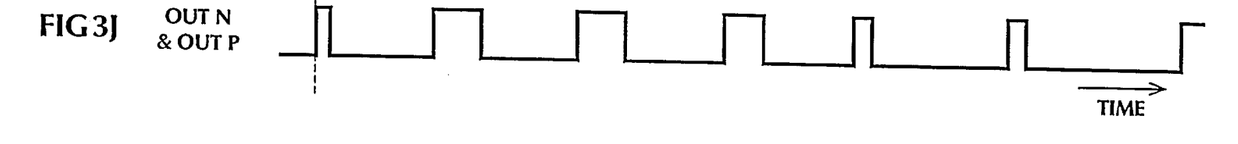

The RAMPA signal, which represents the voltage stored on the capacitor 337, is compared by the comparator 339 of FIG. 1 to a voltage on the COMP pin 1 of the controller 300 as shown in FIG. 1. The COMP pin 1 voltage level is an error signal formed by the brightness level set on the DIM pin 7 and the feedback signal from the ISNS pin 3. This brightness signal is shown as a horizontal dotted line superimposed on the RAMPA signal of FIGS. 3A–3J. The output of the comparator 339 is shown by the pulse in the DCMP signal of FIG. 3 beginning at time T5 and ending at the time T7. This pulse is centered about the zero crossing of the signal VSNS at approximately the time T6 and is used to drive the lamp resonant circuit. At the time T9, the oscillator and sync logic circuit 304 rapidly discharges the capacitor 337 through the transistor 331. The RAMPA signal then remains low until the third positive zero crossing 3 of the signal VSNS at approximately the time T12 and the cycle described above repeats.

The RAMPB signal is the voltage on the capacitor 344. Referring back to approximately the time T3, the capacitor 344 is rapidly discharged by the oscillator and sync logic circuits 304 through the transistor 332. At the second positive zero crossing 2 of the signal VSNS, which occurs at approximately the time T6, the capacitor 344 begins to be charged by the transconductance amplifier 342 at a rate determined by the biasing signal to the transconductance amplifier 342. At the time T9, when the signal VSNS reaches a negative zero crossing, the capacitor 344 is discharged by the oscillator and sync logic circuit 304 at the same rate that it was charged. At the time T12, when the voltage on the capacitor 344 reaches zero (actually 0.3 volts as determined by the voltage at the non-inverting input to the comparator 343), the oscillator and sync logic circuit 304 stops discharging the capacitor 344 and begins charging the capacitor 344.

The RAMPB signal, which represents the voltage stored on the capacitor 344, is compared by the comparator 346 of FIG. 1 to a voltage level on the COMP pin 1 of the controller 300 as shown in FIG. 1. The COMP pin 1 voltage level is an error signal formed by the brightness level set on the DIM pin 7 and the feedback signal from the ISNS pin 3. This brightness signal is shown as a horizontal dotted line superimposed on the RAMPB signal of FIGS. 3A–3J. The output of the comparator 346 is shown by the pulse in the DCMP signal of FIGS. 3A–3J beginning at time T11 and ending at the time T13. This pulse is centered about the zero crossing of the signal VSNS at approximately the time T12 and is used to drive the lamp resonant circuit. At the time T14, the oscillator and sync logic circuit 304 rapidly discharges the capacitor 344 through the transistor 331. The RAMPB signal then remains low until the fourth positive zero crossing 4 of the signal VSNS and the cycle described above repeats.

Thus, a circuit for centering pulses about a zero crossing without using a phase comparator or phase locked loop has been described. Rather, the signals RAMPA and RAMPB are synchronously interleaved. Two ramp signals RAMPA and RAMPB are needed, rather than a single ramp signal, because it is not assured that the zero crossings will coincide precisely with the capacitors 339 and 344 being discharged to zero volts (0.3 volts). For this reason, the capacitors 339 and 344 and rapidly discharged a the times T9 and T14, respectively. However, it will be apparent that a single ramp signal could be used to generate all the pulses in the DCMP signal, but with reduced accuracy in centering the pulses about zero crossings of the VSNS signal.

The invention synchronizes the pulses of the DCMP signal to the sinusoidal signal VSNS within only one cycle, whereas, a phase locked loop could take longer or could fail to synchronize at all.

Referring to FIGS. 3A–3J, it can be seen that the RAMPA signal changes slope at the times T2 and T4, and the RAMPB signal changes slope at the times T8 and T10. To achieve the object of centering the pulses about a zero crossing, it is important that each of the capacitors be charged and discharged at the same rates. For example, from the time T1 to the time T6, the RAMPA signal must be symmetrical about the time T3 and from the time T6 to the time T12, the RAMPB signal must be symmetrical about the time T9. As described above, the RAMPA and RAMPB signals are compared to the voltage level shown by the dotted line superimposed on the RAMPA and RAMPB signals shown in FIGS. 3A–3J. Therefore, the level of the voltage on the capacitor 337 or 344 is not important so long as the voltage level on the capacitor 337 or 344 is higher than the voltage COMP represented by the dotted line and so long as the capacitors are charged and discharged at equal rates.

The rate at which the capacitor 337 is charged depends upon the bias current to the transconductance amplifier 335. The bias current to the transconductance amplifier 335 has two components. A first component is provided by the current mirror 341. A second component is provided by the transconductance amplifier 338 through the diode 340. The diode 340 prevents current from entering the output of the transconductance amplifier 338. Similarly, the rate at which the capacitor 344 is charged depends upon the bias current to the transconductance amplifier 342. The bias current to the transconductance amplifier 342 also has two components. A first component is provided by the current mirror 341. A second component is provided by the transconductance amplifier 345 through the diode 347. The diode 347 prevents current from entering the output of the transconductance amplifier 345.

At the time T1, upon the first positive zero crossing of the signal VSNS, the output of the AND gate 329 is a logical low voltage, the voltage on the capacitor 337 is below 1.9 volts, and the transconductance amplifier 335, biased by both the current mirror 341 and the transconductance amplifier 338, charges the capacitor 337. Once the voltage on the capacitor 337 reaches 1.9 volts, at the time T2, the transconductance amplifier 338 stops providing biasing current to the transconductance amplifier 335 so that the capacitor 337 is charged at a slower rate, as shown by the reduced slope of the RAMPA circuit between the times T2 and T3. Then, once the negative zero crossing of VSNS occurs, at the time T3, the capacitor 337 is discharged at the slower rate until the capacitor 337 is discharged to below 1.9 volts. Once the capacitor 337 is discharged to below 1.9 volts, at the time T4, the transconductance amplifier 338 causes the rate at which the transconductance amplifier 335 discharges the capacitor 337 to increase again to correspond to the rate that the capacitor 337 was charged between the times T1 and T2.

Similarly, once the voltage on the capacitor 344 is above 1.9 volts, the rate at which the transconductance amplifier charges and discharges the capacitor 344 is reduced because the transconductance amplifier 345 stops providing an additional biasing current to the transconductance amplifier 342. When the voltage on the capacitor 344 is below 1.9 volts, the rate at which the transconductance amplifier 342 charges the capacitor 344 is increased because the transconductance amplifier 345 provides the additional biasing current.

A benefit of this technique is that the voltage headroom required for the signals RAMPA and RAMPB is reduced (i.e. lower supply voltage levels are required) while maintaining a relatively high gain when the RAMPA and RAMPB signals are below the 1.9 volt threshold. This relatively high gain increases the accuracy of the pulse widths and the ability to control the slope of the RAMPA and RAMPB signals increases the ability to control the pulse widths of the DCMP signal.

If voltage on the external resistor 400, illustrated in FIG. 2, increases, the current into the RR pin 4 of the controller will increase, as shown in FIG. 3 by the transition in the signal BATT at the time T15 to the time T16, and the capacitors 337 and 344 will be charged even more rapidly than described above. This results in a steeper slope in the RAMPA and RAMPB signals. Thus, the pulses in the DCMP signal are narrower to reflect the reduced duty cycle required to maintain a given lamp brightness. This is achieved by the current mirrors 350 and 351 increasing the biasing current to the transconductance amplifiers 338 and 345. Thus, when the RAMPA and RAMPB signal are below 1.9 volts, the slope is increased in comparison to the slope which results when BATT is at the lower level. When the RAMPA and RAMPB signals are above 1.9 volts, the slope is the same as when BATT is at the lower level because the bias current provided by the current mirror 341 is not increased when BATT is at the higher level. Thus, another means for controlling the slope of the RAMPA and RAMPB signals is disclosed. It will be apparent that any number of different slopes which are selected based on any criteria could be employed or a constant slope could be employed.

Fluorescent lamps have "negative resistance." This means that the operating voltage decreases as power dissipation in the lamp increases. It also means that a higher voltage must be applied to start a fluorescent lamp than is required to sustain operation of a fluorescent lamp. Therefore, it is necessary that the voltage delivered to the lamp at start up remain at a high level for a minimum amount of time.

FIGS. 4A–4E show a diagram of waveforms relating to start-up of the lamp and to an overvoltage fault condition. At the time TA, the lamp is off. At the time TB, the ON/OFF pin 6 of the controller is activated to turn the lamp on. This activates the negative edge delay circuit which turns on the transistor 356 and the transistor 363 of FIG. 1 in order to initialize the voltage on the capacitor 409 to zero volts and to initialize the voltage on the capacitor 410 to 0.3 volts through the resistor 359.

After time TB, and after the negative edge delay 309 has timed out, the resonant circuit may still be at rest. The oscillator sync logic circuit 304 will begin charging RAMPA. Without a zero crossing transition, RAMPA will continue to charge until the capacitor 337 is charged close to the internal supply of the controller 300. When the signal on RAMPA or RAMPB come to within about 0.8 volts of the supply, additional logic circuits not shown in FIG. 1 cause RAMPA to enter a discharge cycle. When RAMPA reaches 0.3 volts, it reenters a charging cycle. This cycle repeats and the controller self-oscillates without the presence of zero-crossing synchronization signals. At the same time, the voltage on the COMP pin 1 will increase from 0.3 volts, gradually increasing the pulse widths of this self-oscillating signal until the VSNS input begins to register zero crossings and the controller 300 synchronizes to the resonant network.

Before the lamp has ignited, the resonant circuit is unloaded and of very high Q. Since the controller 300 is synchronized to the natural resonant frequency, the output voltage increases to the point that the external Zener diodes begin to break down. Because the controller 300 cannot directly control the voltage levels in the resonant circuit, the Zener diodes 415 and 420 prevent the voltage levels from becoming excessive. It will be apparent that the break down voltages of the diodes must be high enough to allow the fluorescent lamp to ignite. The signal at the VSNS pin 14, as programmed by external resistors 414 and 419, is then also above the 0.25 volt threshold to put the controller into the overvoltage mode (OV=1).

Figure 4A:
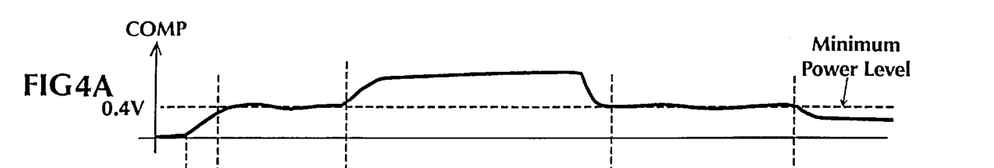
Figure 4B:
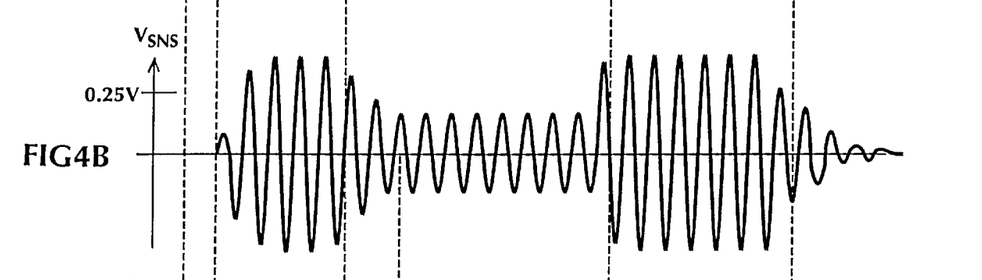
Figure 4C:
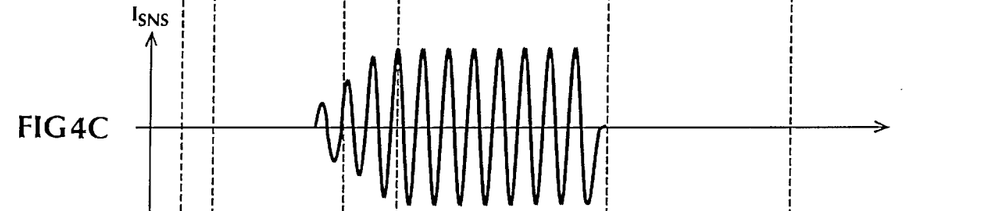
Figure 4D:
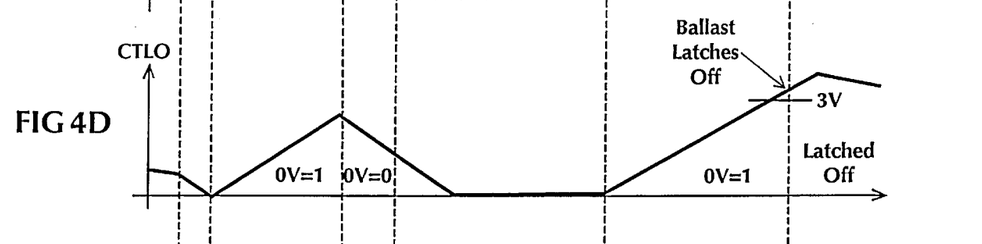
Figure 4E:
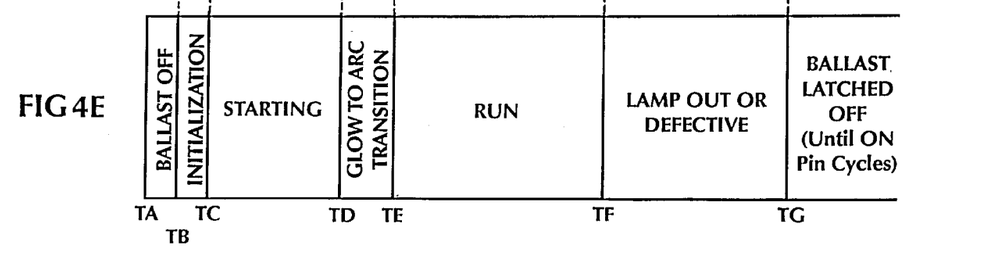

Because the signal VSNS reaches a voltage greater than 0.25 volts before the lamp ignites, the output of the comparator 315 sets the R-S flip-flops 317 and 318. Because the outputs of the flip-flops 317 and 318 are set, the output of the OR gate 319 is a logical high voltage. This turns on the transistor 352 which gradually charges the capacitor 410 to 0.4 volts and causes the output of the OR gate 354 to activate the transconductance amplifier 368. The transconductance amplifier 368 begins charging the capacitor 409 coupled to the CTLO pin 2 of the controller. Therefore, during the time period TC to TD, after the circuit has synchronized to the network and broken down the Zener diodes 415 and 420, and entered the overvoltage mode, the voltage on the CTLO pin 2 begins to rise as shown in FIGS. 4A–4E.

In addition, during the time period TC to TD, while in the overvoltage mode, the output of the OR gate 319 causes the transistor 352 to turn on and causes the transistor 358 to turn off. Therefore, the externally generated signal to the DIM pin 7 is no longer coupled to the capacitor 410 to set the lamp brightness level. Rather, the capacitor 410 is gradually charged to 0.4 volts through the transistor 352 and resistor 360.

During the time period TC to TD, while in the overvoltage mode, the lamp is off. Therefore, the signal on the ISNS pin 3 indicates that no current is flowing in the lamp as shown in FIGS. 4A–4E. At about the time TD, the fluorescent lamp begins to transition from off to on. Therefore, current begins to flow in the lamp as indicated by the signal on the ISNS pin 3 in FIGS. 4A–4E. Also, the signal VSNS drops to below 0.25 volts because the lamp begins to consume power from the resonant circuit. This causes the flip-flops 317 and 318 to be reset and the output of the OR gate 319 to be a logical low voltage level. Therefore, the OR gate 354 causes the transconductance amplifier 368 to begin discharging the capacitor 409 as shown in FIGS. 4A–4E by the reduction in the voltage level of the signal on the CTLO pin 2. Also, the transistor 352 is turned off by the output of the OR gate 319 so that the DIM pin 7 is coupled to set the voltage on the capacitor 410 to control the lamp brightness.

During the time period TE to TF, the fluorescent lamp is operating normally. Beginning at the time TF, FIGS. 4A–4E shows what happens when the fluorescent lamp becomes defective or is removed from the circuit. As during start-up, the signal VSNS rises to above 0.25 volts and the lamp current, as represented by the signal at the ISNS pin 3, drops to zero. Also, as during start-up, the transconductance amplifier 368 begins charging the capacitor 409 which is shown in FIGS. 4A–4E by the increasing voltage at the CTLO pin 2. In addition, the feedback loop coupling the DIM pin 7 to the capacitor 410, is interrupted because the capacitor 410 is gradually brought to 0.4 volts through the transistor 352 reducing the power to the resonant circuit by reducing the width of the pulses in DCMP signal. However, unlike in the start-up situation, the fluorescent lamp does not ignite. Therefore, the voltage on the capacitor 409 continues to rise until it reaches 3.0 volts. When 3.0 volts is reached, the output of the comparator 367 to become a logical high voltage. The output of the comparator 367 inhibits power from being applied to the resonant lamp circuit. Power is inhibited until the ON/OFF pin 6 is activated which discharges the capacitor 409 through the transistor 363.

Therefore, when an over-voltage condition is sensed, the feedback loop for controlling lamp brightness is interrupted in order to gradually (over about 1 ms) reduce the width of the pulses driving the resonant circuit by bringing the voltage on the capacitor 410 to 0.4 volts. This reduces power to the resonant circuit, and therefore, reduces power dissipated by the Zener diodes. In addition, upon sensing an over-voltage condition, the capacitor 409 is gradually charged. After a predetermined amount of time (about 50 ms to 2 s), if the over-voltage condition persists, the voltage on the capacitor 409 reaches 3.0 volts. When this occurs, voltage is shut down to the resonant circuit preventing the Zener diodes from dissipating any additional power. Because fluorescent lamps require a higher voltage to start than to maintain operation, the controller 300 waits the predetermined amount of time for the lamp to start before shutting down power to the resonant circuit.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiments chosen for illustration without departing from the spirit and scope of the invention.

Specifically, it will be apparent to one of ordinary skill in the art that the device of the present invention could be implemented in several different ways and the apparatus disclosed above is only illustrative of the preferred embodiment of the invention and is in no way a limitation. For example, it would be within the scope of the invention to vary the values of the various components and voltage levels disclosed herein. It will be apparent that transistors of one type, such as NMOS, PMOS, bipolar pnp or bipolar npn can be interchanged with a transistor of another type, and in some cases interchanged with diodes, with appropriate modifications, and so forth. In addition, the transconductance amplifiers of the present invention could be implemented by any type of current source. Also, a switch may be implemented with a transistor of any type. Further, the logic circuits of the oscillator and sync logic circuit 304 could be implemented in many different ways while remaining within the spirit and scope of the invention.

What is claimed is:

1. A circuit for protecting against an overvoltage condition, comprising:
   a. a resonant circuit;
   b. a load coupled to the resonant circuit;
   c. a first Zener diode coupled to a node of the resonant circuit for limiting a voltage at the node when the first Zener diode breaks down; and
   d. means for controlling power delivery to the resonant circuit, the means for controlling including means for reducing power delivery to the circuit to a predetermined power level when the voltage at the node exceeds a predetermined voltage level wherein the predetermined power level results in a voltage level at the node that causes the first Zener diode to continue to break down and further including means for stopping power delivery to the resonant circuit a predetermined amount of time after the voltage at the node exceeds the predetermined voltage level.

2. The circuit according to claim 1 wherein the predetermined amount of time is in the range of 50 ms to 2 s whereby a required power dissipation capability of the first Zener diode is reduced in comparison to a required power dissipation capability of the first Zener diode had the predetermined amount of time been infinite.

3. The circuit according to claim 1 further comprising a second Zener diode coupled in series with the first Zener diode wherein the predetermined amount of time is in the range of 50 ms to 2 s whereby a required power dissipation capability of the Zener diodes is reduced in comparison to a required power dissipation capability of the Zener diodes had the predetermined amount of time been infinite.

4. The circuit according to claim 1 wherein the load is a fluorescent lamp.

5. A circuit for protecting a circuit element against damage caused by an overvoltage condition at a node, comprising:
   a. means for delivering power to the circuit;
   b. means for reducing an amount of power delivery to the circuit to a predetermined power level after a voltage at the node exceeds a predetermined voltage level; and
   c. means for stopping delivery of power to the circuit when the voltage at the node exceeds the predetermined voltage level for a predetermined amount of time.

6. The circuit according to claim 5 further comprising a first Zener diode wherein a cathode of the first Zener diode is coupled to the node and further comprising a second Zener diode having an anode coupled to an anode of the first Zener diode and the second Zener diode having a cathode coupled to a ground node.

7. The circuit according to claim 5 wherein the circuit comprises a resonant circuit, wherein the resonant circuit is coupled to a load for drawing power from the circuit.

8. The circuit according to claim 5 wherein the means for reducing reduces the power delivery to the circuit to the predetermined power level within 1 ms after the voltage at the node exceeds the predetermined voltage level.

9. The circuit according to claim 5 wherein the predetermined amount of time is in the range of 50 ms to 2 s.

10. A circuit for protecting against an overvoltage condition, comprising:

a. means for delivering power to the circuit;

b. a Zener diode coupled to a node of the circuit; and c. means for reducing power delivery to the circuit to a predetermined power level when the Zener diode breaks down wherein the predetermined power level results in a voltage level at the node that causes the Zener diode to continue to break down.

11. The circuit according to claim 10 further comprising means for stopping power delivery to the node after the Zener diode has continued to break down for a predetermined amount of time.

12. The circuit according to claim 11 wherein the predetermined amount of time is in the range of 50 ms to 2 s.

13. The circuit according to claim 11 wherein a circuit element requires the voltage at the node to exceed the breakdown voltage of the Zener diode in order to begin operation.

14. The circuit according to claim 13 wherein the circuit element is a fluorescent lamp.

15. The circuit according to claim 14 wherein the circuit comprises a resonant circuit coupled to the fluorescent lamp.

16. A circuit for protecting against an overvoltage condition, comprising:

a. means for delivering power to the circuit;

b. a Zener diode coupled to a node of the circuit; and c. means for stopping power delivered to the circuit a predetermined amount of time after the Zener diode breaks down.

17. The circuit according to claim 16 further comprising means for reducing power delivered to the circuit to a predetermined power level when the Zener diode breaks down wherein the predetermined power level results in a voltage level at the node that causes the Zener diode to continue to break down.

18. The circuit according to claim 16 wherein the predetermined amount of time is in the range of 50 ms to 2 s.

19. The circuit according to claim 16 wherein a circuit element requires the voltage at the node to exceed the breakdown voltage of the Zener diode in order to begin operation.

20. The circuit according to claim 19 wherein the circuit element is a fluorescent lamp.

21. The circuit according to claim 20 wherein the circuit comprises a resonant circuit coupled to the fluorescent lamp.

22. A circuit for providing power to a fluorescent lamp and for preventing damage to a circuit element caused by an overvoltage condition at a circuit node, the circuit comprising:

a. a power source;

b. a resonant circuit coupled to the power source wherein the resonant circuit comprises the circuit node;

c. a fluorescent lamp coupled to receive power from the resonant circuit wherein the fluorescent lamp requires a minimum voltage level for a minimum period of time to ignite;

d. means for sensing a voltage representative of the voltage at the circuit node coupled to the circuit node;

e. a controller circuit for controlling an amount of power delivered to the resonant circuit from the power source wherein the controller is unable to directly control a voltage at the circuit node and wherein the controller circuit comprises:

i. means for reducing the amount of power delivered to the resonant circuit when the voltage at the circuit node exceeds a predetermined voltage level wherein the predetermined voltage level is higher than the minimum level required to cause the fluorescent lamp to ignite;

ii. means for ceasing power delivery to the resonant circuit when the voltage at the circuit node exceeds the predetermined voltage level for a predetermined amount of time wherein the predetermined amount of time is longer than the minimum amount of time required for the fluorescent lamp to ignite;

f. a first Zener diode having a first anode and a first cathode wherein the first cathode is coupled to the circuit node; and g. a second Zener diode having a second anode and a second cathode wherein the second anode is coupled to the first anode and the second cathode is coupled to the ground node.

23. The circuit according to claim 22 whereby the fluorescent lamp may be ignited when the fluorescent lamp is not defective and is present and whereby a circuit element is protected against an overvoltage condition when the fluorescent lamp is defective or absent by the Zener diodes having lower power ratings than would otherwise be required.

* * * * *

UNITED STATES PATENT AND TRADEMARK OFFICE
CERTIFICATE OF CORRECTION

PATENT NO. : 5,818,669

DATED : October 6, 1998

INVENTOR(S) : Urs H. Mader

It is certified that error appears in the above-identified patent and that said Letters Patent is hereby correct as shown below:

IN THE DRAWINGS

Replace Figure 1b, on drawing sheet 2 of 6 with the attached drawing sheet which shows the correct between "CTLO" at pin to the drain FET 363.

Signed and Sealed this

First Day of June, 1999

Attest:

Q. TODD DICKINSON

Attesting Officer

Acting Commissioner of Patents and Trademarks

FIGURE 1b

FIGURE 1b